Figure 1:
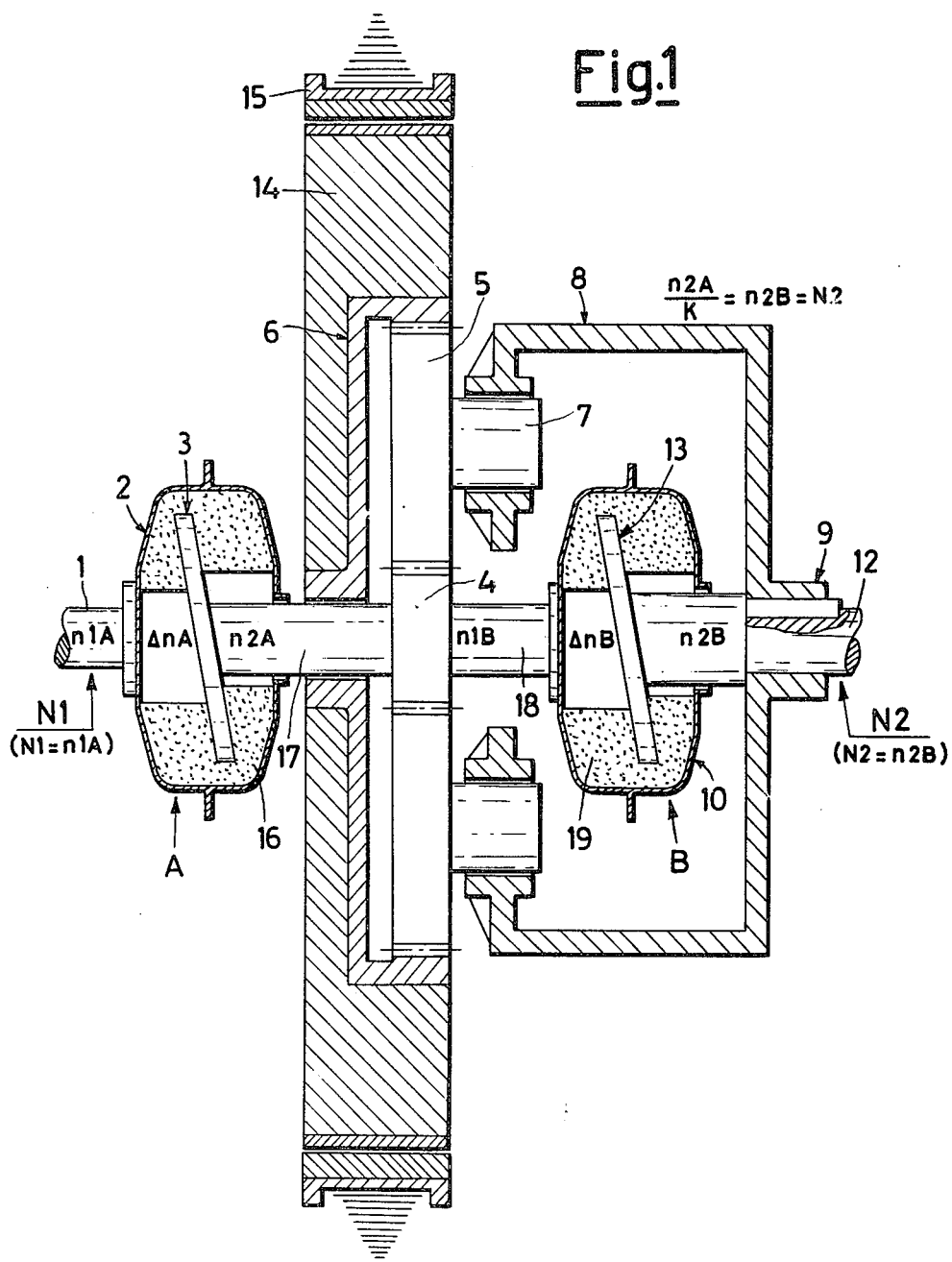

United States Patent
Ranzi, deceased

[11] 3,939,731
[45] Feb. 24, 1976

[54] DIFFERENTIAL TORQUE MULTIPLYING DEVICE

[75] Inventor: Ubaldo Ranzi, deceased, late of Legnano, Italy, by Cristiana Ranzi, Cesare Giannetta Ranzi, Giulio Ranzi, Riccardo Ranzi and Matteo Ranzi, heirs

[73] Assignee: S.p.A. Ranzi Legnano, Legnano, Italy

[22] Filed: Jan. 8, 1974

[21] Appl. No.: 431,777

Related U.S. Application Data

[63] Continuation-in-part of Ser. No. 127,323, March 23, 1971, abandoned.

[30] Foreign Application Priority Data
Mar. 24, 1970   Italy ................................. 22396/70

[52] U.S. Cl. ..................... 74/688; 74/786; 74/794; 192/105 A
[51] Int. Cl.² ................... F16H 47/08; F16H 57/10 F16D/23/10;
[58] Field of Search ........................... 74/688, 786, 74/787, 793, 794; 192/105 A

[56] References Cited
UNITED STATES PATENTS

| | | | |
|---|---|---|---|
| 2,131,619 | 9/1938 | Duffield | 74/688 |
| 2,143,312 | 1/1939 | Griswold | 74/688 |
| 2,326,570 | 8/1941 | Schaefer et al. | 74/688 X |
| 2,901,074 | 8/1959 | Badin | 192/105 A X |
| 3,374,871 | 3/1968 | Ranzi | 192/105 A X |
| 3,431,798 | 3/1969 | Dillard et al. | 74/688 |

FOREIGN PATENTS OR APPLICATIONS

| | | | |
|---|---|---|---|
| 615,211 | 2/1961 | Canada | 74/688 |
| 458,842 | 12/1936 | United Kingdom | 74/688 |

*Primary Examiner*—Samuel Scott
*Assistant Examiner*—P. S. Lall
*Attorney, Agent, or Firm*—Cushman, Darby & Cushman

[57] ABSTRACT

A differential torque transmitting device is disclosed which comprises two serially arranged fluid metal couplings and a reducing gear inserted in parallel between the output members of the first and the second coupling. Means are provided to disconnect the reducing gear as the speed of the driven shaft equals that of the driving shaft.

5 Claims, 4 Drawing Figures

DIFFERENTIAL TORQUE MULTIPLYING DEVICE

This is a continuation-in-part application of the prior application Ser. No. 127,323, filed Mar. 23, 1971 now abandoned.

This invention relates to torque-transmitting arrangements.

More particularly the present invention is directed to a torque-transmitting arrangement, adapted to transmit the power generated by motive means to the input shaft of a driven machine, such as to bring, as quickly as possible, upon the motive means are started, the said input shaft to its normal operation, without having recourse to clutch means, but through a gradual action, and without imposing serious stresses on the mechanical components. In the following by normal operation the condition is meant in which the output shaft of the motive means and the said input shaft of the driven machine are rigidly connected, even if through coupling means, whereby, apart from any power losses in the same coupling means, these shafts rotate at the same rpm.

Besides the great number of gearboxes comprising geararrangements and involving a manual action in order to bring the input or driven shaft step by step up to the required operating rpm and down therefrom, several types of change mechanisms are known in the prior art by which the torque is initially transmitted to the said input shaft through a reduction gear so that, as it is well known in the art, the inertia of the said input shaft is more easily overcome.

Upon a predetermined rpm value of said input shaft is achieved, the transmission of the driving power is switched on the direct transmission path. Otherwise stated, in the systems according to the prior art all the torque generated by the prime mover, is entirely applied to the said input shaft of the driven machine only through the reduction gearing and the switching to the direct driving through the coupling means always involves an abrupt step or change, the latter being the less appreciable, the lower the difference between the rpm of the said input shaft achieved through the reduction gear and the rpm value of the steady operation.

The main purpose of the present invention is that of providing a torque transmitting arrangement which permits the torque generated by the prime mover to be transmitted to the input shaft of the driven machine both through a reduction gear and through a direct coupling the ratio of the torque transmitted through the direct coupling to that transmitted through the reduction gear gradually increasing, without abrupt changes, until the steady running condition is achieved, in which all the said torque passes through the direct coupling.

Another purpose of the present invention is that of providing a torque transmitting arrangement ensuring that, in case of accidental abrupt speed reduction of the said input shaft, the reduction gearing is immediately brought into action so as to restore the normal running conditions.

To accomplish these and other purposes, the present invention provides a differential torque transmitting device for continuously and gradually transmitting torque between a prime mover developing a predetermined torque and an input shaft of a driven machine (generally known as "load") comprising first and second rotary slip couplings, each having an input member and an output member, the output member of the first coupling being drivingly connected to the input member of the second coupling, an epicyclic reduction gear train having an input element driven by the output member of the first coupling at a speed which bears a constant relationship to the speed of the input member of the second coupling, a reaction element and an output element drivingly connected to the output element of the second coupling, and means acting to hold the reaction element of said gear train fixed against rotation in one direction only and adapted automatically to release said reaction element for rotation in the opposite direction to discontinue the transmission of power through the reduction gear train to the output element of the second coupling and to permit the speed of the output member of said second coupling to rise to a value equal to that of the input member of the second coupling, said second coupling being designed so that, whenever the input shaft of the driven machine is not steadily operating, the torque transmitted by the output member of the second coupling is always lower than the torque transmitted by the output member of the said first coupling.

As it will be realized from the following description and from the drawings, in the torque-transmitting device of the present invention two parallel torque paths are defined, namely:

a. the torque path comprising the output member of the first coupling, the input and the output member of the second coupling, and the input shaft of the driven machine, said first path being the only fully operative path when the driven machine is normally steadily running; and b. the torque path comprising the output member of the first coupling, the epicyclic reduction gear train, as above defined, and the input shaft of the driven machine, this torque path being operative whenever the input shaft of the driven machine is running at a rpm lower than that corresponding to the steady operation.

The slipping couplings can be of several types, such as the type in which spherical metal particles are employed as the working fluid and in which the gradual gripping action between the driving member and the driven member is due to a centrifugal force differential which, on account of the rotary action of the members, causes the metal fluid to act as a coupling means.

The said means for discontinuing the transmission of power through the epicyclic train may be an unidirectional brake or a free-wheel mechanism.

Figure 2:
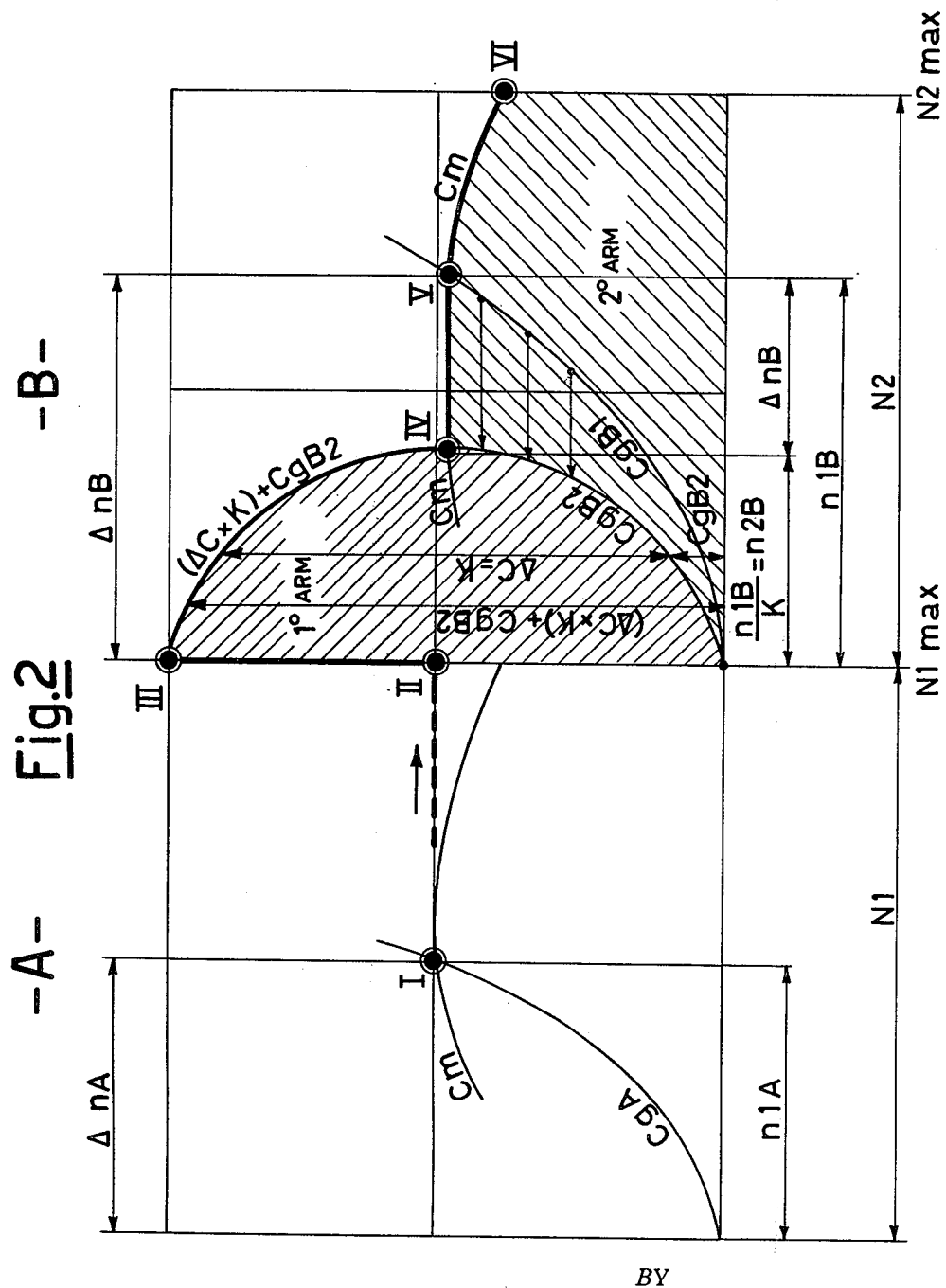
Figure 3:
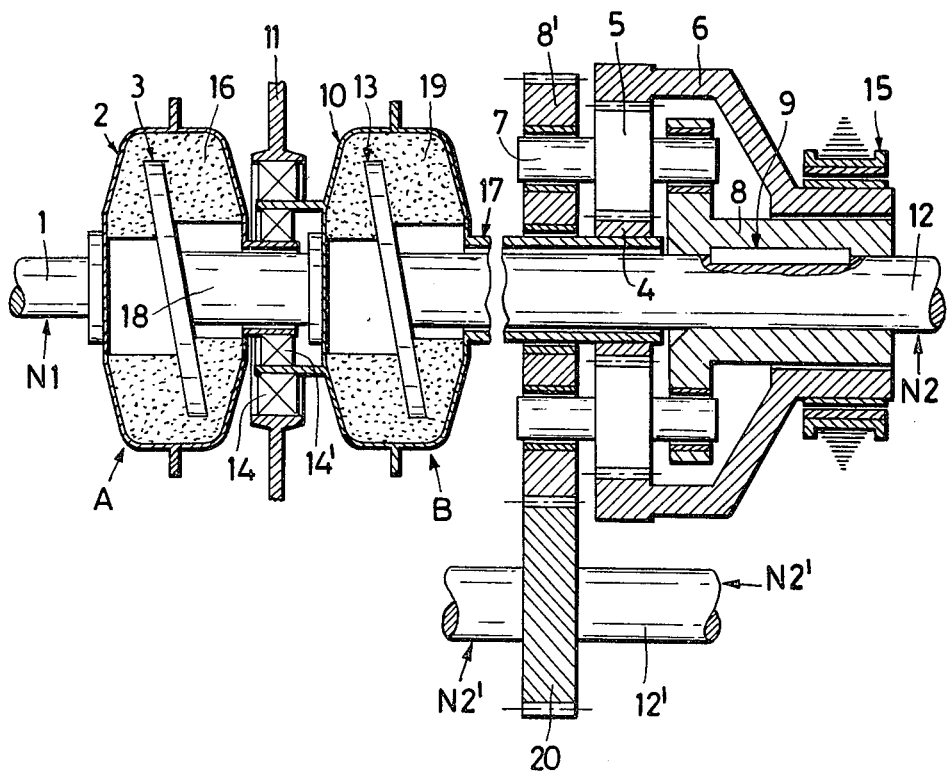
Figure 4:
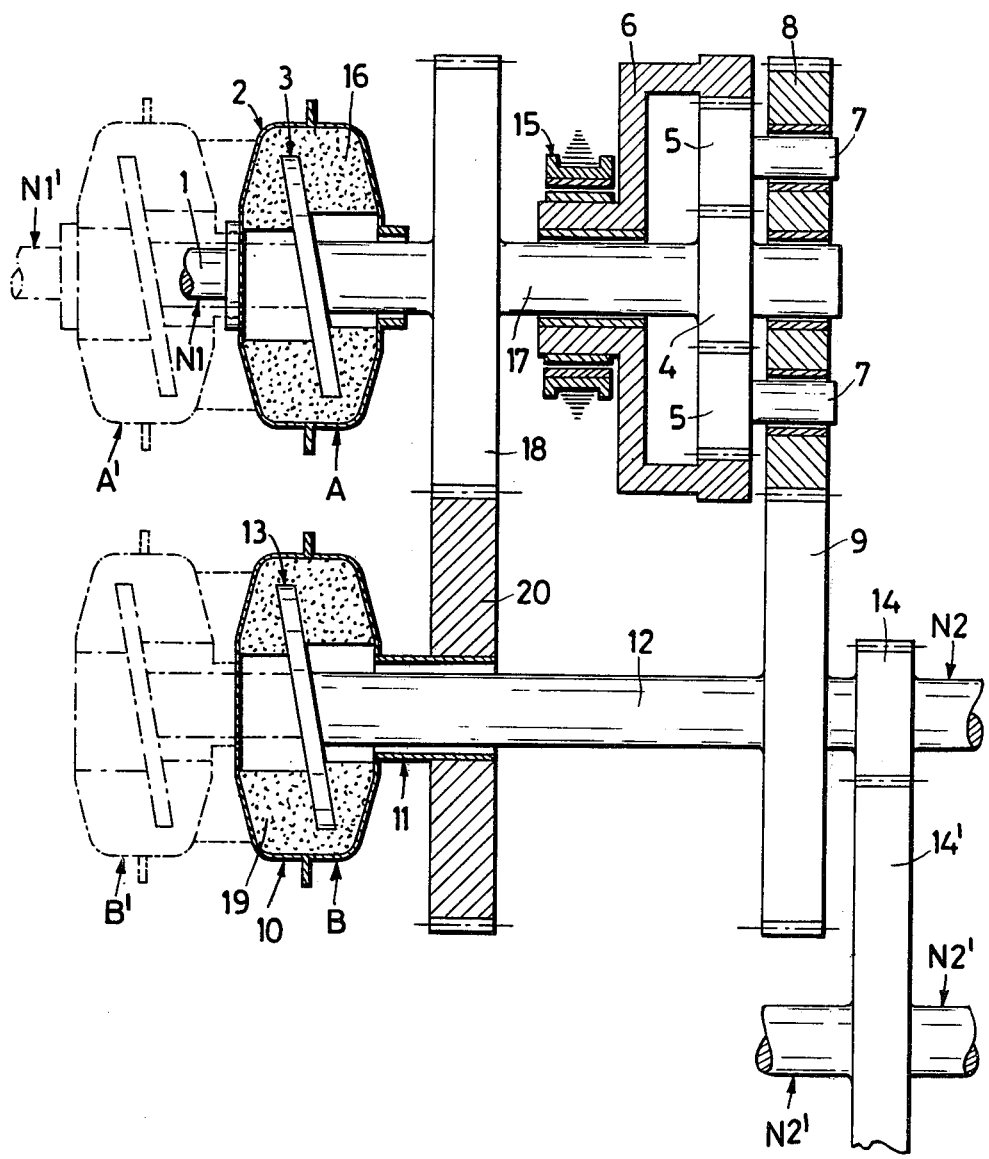

The invention will be better understood by referring to the embodiments illustrated by way of example in the accompanying drawings, wherein:

FIG. 1 is a diagrammatical view in axial cross-section, of the device according to the invention, FIG. 2 is a graph which illustrated the operation of the device, and FIGS. 3 and 4 respectively show two further embodiments of the invention.

The constructional arrangement of the device can be seen in FIG. 1, in which two rotary slip couplings A and B are connected in series between a driving motor and a machine which constitutes the load. The motor (not shown) drives the input shaft 1 of coupling A, and the machine load (not shown) is connected to the output shaft 12 of coupling B.

The casing 2 of the coupling A contains a metal "fluid" 16 which comprises a number of tiny spherical metal particles and reproduces on a macroscopic scale the molecular structure of a fluid, so that it follows, within certain limits, the laws of the fluid physics, and transmits a drive to the output member of runner 3 of the coupling which is immersed therein.

The output member 3 of coupling A is connected to a shaft 17 on which is secured a sun gear 4 of an epicyclic reduction gear train. The train includes planetary gears 5 which mesh with the sun gear 4 and with an annular gear 6. The planetary gears are carried by pins 7 on a cage 8 which is keyed at 9 to the output shaft 12. Annular gear 6 is shown as being connected to a flywheel 14 which can be held stationary by a one-way band brake 15.

Secured to shaft 17 is a coaxial shaft 18 which is connected to the rotary casing or impeller 10 of coupling B. Coupling B is of the same type as coupling A, incorporating a runner 13 and a metal working "fluid" 19.

The torque transmitted to shaft 17 by coupling A can take two paths, the first of which is provided by the epicyclic train and the second of which is provided by coupling B.

The torque fraction which passes along the first path is converted into a larger torque according to the ratio K which is the ratio of the diameters of the sun gear 4 and the annular gear 6, and is transmitted by way of pins 7, cage 8 and key 9 to the final drive shaft 12.

The torque fraction which is transmitted along the second path is the reaction torque on the sun gear and this torque is transmitted through coupling B and is a function of the instantaneous rotational speed of casing 10 of coupling B. This torque fraction is transmitted to shaft 12.

The predominent action in the whole system is thus given by the rotation of the casing 10 of coupling B which draws from the output member 3 of coupling A, by way of shaft 17, gear 4 and shaft 18, the torque it is able to transfer to shaft 12 as a function of the square of its speed, said torque being consequently complementary to any torque conversion in the first path. Thus the torque transmitted along the second path governs the torque conversion in the first path.

The torque drawn from the coupling B as a function of the speed thereof does not pass through the planetary system and does not therefore undergo any multiplication. This is the condition which gives rise to a differential torque transfer $\Delta C$ along the first path. The differential torque $\Delta C$ is multiplied by the ratio K of the planetary system. This torque can vary infinitely between two limiting values. Its maximum value is given by the maximum torque in shaft 17 multiplied by a factor of K when the speed N2 of shaft 12 = 0 (in this case no torque is drawn from the coupling B), and its minimum value is zero, when the speed N2 of shaft 12 = $n2B$ = N1B = $n1A$ where $n2B$ = the speed of the output element 13 of coupling B $n1B$ = the speed of shaft 18 and $n1A$ = the speed of the input shaft 1 of coupling A as shown on FIG. 1, and when, consequently, the entire torque is drawn from the coupling B and no residual torque passes through the first path of the planetary system for conversion (multiplication).

The two limiting conditions, and the intermediate conditions can be better understood from the graph in FIG. 2. It should be borne in mind when examining the graph that the general operation of the system is dominated by the values N2, which is the speed of the driven machine and which is closely dependent on the load torque $Cr$ thereof, both during acceleration when starting and under working conditions, when the load may vary. The greater $Cr$ is, the smaller N2 is and consequently the smaller is the torque passing directly through coupling B and the greater is the differential torque $\Delta C$ which, passing through the planetary system, is multiplied ($\Delta C \times K$) and transmitted to shaft 12 and the driven machine. Thus to every demand for increased torque by the driven machine, there corresponds, for another value of N2, an equivalent driving torque (within the limits of the driving torque $Cm$ of the engine driving shaft 1) which is either totally or partially converted (multiplied) by the planetary gears in the first path.

As soon as portion $\Delta C$ of the driving torque $Cm$ passes along the first path, annular gear 6 tends to rotate in the opposite direction to shaft 1, but is held by the brake 15 which operates on the gear 6 for that direction of rotation only.

When Cm exceeds Cr, slip $n \Delta A$ in the coupling A becomes substantially nil, so that effectively $n1A$ will equal $n2A$ (the speed of shaft 17), $n1B$ and N1 (the speed of input shaft 1).

With $n1B$ equal to N1 the entire torque $Cm$ is absorbed and transferred by coupling B.

The value of the torque differential $\Delta C$ passing through the planetary system is zero and the gear 6 is no longer loaded by any reaction moment. If, at that instant the brake 15 is released automatically by a suitable servo mechanism, the gear 6 is released and starts to rotate in the same direction as shaft 1, becoming gradually accelerated until it reaches synchronization with the cage 8, and shaft 12 in the first path of the system.

The brake 15 can be replaced by a free-wheel mechanism or locking device which prevents the gear 6 from being rotated in a direction opposite to the direction of rotation of the device, while simultaneously transmitting the reaction moment to the supports of the mechanism.

The optional use of a flywheel mass 14 with the gear 6 would impart its own resistance to any fluctuation in the transitions between braked condition and free rotation of the gear 6. It would also serve to prevent fluctuations in the system at the instant of the transition.

The synchronization of the speed of wheel 6 with the speed N2 of the members 8 and 12, is not the general synchronization of the system since the said members still have, at the instant when the gear 6 starts to rotate freely, a speed which is inversely proportional to the torque multiplication ratio K of the planetary system, that is $$\frac{n1B}{K} = N2 .$$

As long as the gear 6 remains braked the speed of rotation of the shaft 12 is equal to that of gear 4 divided by the multiplication ratio K.

Examination of the graph in FIG. 2 provides a further explanation of the functions of the principal members of the differential multiplier with particular respect to the operation of the couplings A and B and the output torque of the system.

These functions are shown divided into two areas A and B for the respective couplings and the former can be considered as a power supply graph, and the latter as a differential power conversion graph as well as a power-transfer graph.

In FIG. 2 the parabolic curve CgA shows the torque transmitted by the coupling A as a function of the engine speed. The curve Cm is the torque speed curve of the engine. At the value $n1A$ of N1 the two curves intersect (point I), which means that at the speed $n1A$ coupling A transmits the driving torque Cm, which is the maximum torque of the engine. The abscissa of area A of the graph also represents the percentage slip $\Delta nA$ of coupling A, the slip being 100% when n2A is zero and 0% when $n2A = n1A$. The values of torque transmitted by coupling A corresponding to various rates of slip (and therefore of speed of the coupling) can be obtained from the curve CgA.

At point II on the graph, the entire torque output of coupling A is considered applied through shaft 17 to a stationary load on shaft 12 so that the slip in coupling A is 100% and the speed n2A and n1B of shafts 17 and 18 is zero, see also FIG. 1. The torque in shaft 17 is applied entirely through the planetary gears which are also stationary, and because of the multiplication ratio K is applied to shaft 12 with a value $\Delta C$ equal to $Cm \times K$, shown at point III on the graph. No power is transmitted through coupling B at this stage. Point III is at the left hand boundary of field B of the graph where the speed N2 of the output shaft 12 (measured along the abscissa of field B) is zero.

As the driven machine starts to rotate, and assuming that $Cm/K$ is greater than the torque requirement Cr of the load machine, all the members of the epicyclic gear train start to rotate including the sun gear 4 which, via shaft 18, rotates the casing of impeller 10 of coupling B. The coupling by virtue only of this rotation, starts to transmit a gradually increasing fraction of the torque Cm according to its own speed-torque curve CgB1, which is a quadratic curve, to transfer it through the runner 13 and the metal "fluid" 19 to shaft 12 and thence to the driven machine.

In order to permit the summation of the torque passing along the two paths, the torque curve CgB1 is shown redrawn at CgB2 to the same speed scale as $n2B$, because at any instant during this time $$n2B = \frac{n1B}{K}.$$

The torque summation curve $(\Delta C \times K) + CgB2$ extends from point III to point IV. The converted torque transmitted along the first path of the system is shown above the curve CgB2, with its ordinate values added to those of CgB2. At point IV, where the coupling B is transmitting the entire torque Cm, the two curves intersect, since when $\Delta C = 0$ any torque conversion action ceases. From point IV, the entire system proceeds transferring from the engine to the driven machine the torque Cm only.

There are still two different speeds in the system, $n1B$ equal to $n2A$ for the impeller or casing 10 of the coupling B, and n1B/K equal to $n2B$, for the runner or output member 13 of the same coupling and the shaft 12, with slip $\Delta nB = n1B-N2B$.

As the wheel 6 begins to be rotated, in the same direction as the driving shaft, it will free the system from the planetary ratio: the epicyclic train, by being accelerated with the driven machine from point IV to point V, will absorb the slip $\Delta nB$ of the coupling B, so that for $\Delta nB = 0$, $n2B$ will equal $n1B$ and thus N2 will equal N1. With both the couplings in synchronization, if the system is devoid of internal slip, the system becomes in effect a rigid axle and the engine and the driven machine will reach together N1 max and N2 max, the final speeds (from point V to point VI).

As already stated in the preamble of the specification, a characteristic feature of the present invention resides in that the second coupling B is designed so as the torque transmitted by the runner 13 is always lower than that transmitted by the runner 3 of the first coupling A, thus ensuring that the reduction gear train is always caused to operate as soon as the rotation speed of the shaft 12 and thus of the runner 13 takes a predetermined lower value with respect to the input shaft 1.

In fact, in case the shaft 12 is caused to rotate at a lower rotation speed (due to a whatsoever external cause), the second coupling would tend to slow down the runner 3 of the first coupling and therefore the reduction gearing train would be automatically excluded from operating, the system attaining a self-balanced condition.

However, if the torque transmitted backwards by the second coupling B to the first coupling A is always lower than the torque transmitted from the coupling A to the coupling B, the self-balanced condition will not be attained and the reduction gearing will be automatically operated, tending to transmit a torque to the shaft 12, thus leading to the restoration of the normal running condition of the shaft 12.

To ensure the aforesaid condition to be fulfilled, several solutions are possible and in the range of a skilled in the art.

For example, the diameter of the runner 13 can be reduced with respect to that of the runner 3. In fact, it has been found that a diameter reduction of 10% is enough to ensure the required result.

Otherwise the inclination of the runner 13 with respect to the axis of the shaft 12 could be lower than that of the runner 3 by a calculated amount, so as to ensure that the slip between the runner 13 and the casing 10 takes place at a lower torque difference than for the coupling A.

The torque multiplying device shown in FIG. 1 can be divided into its main component parts and differently recombined in other forms which may be more suitable in particular cases. Two of these are illustrated in FIG. 3 and FIG. 4 by way of example.

To facilitate understanding, each component part of the structure, having the same function as in FIG. 1, retains the same reference numeral.

Referring to FIG. 3, both of the couplings A and B are aligned on the same axis upstream of the epicyclic train.

This arrangement permits, for example, the size of the couplings to be independent of the size of the epicyclic train, which in some cases facilitates a simplified design and, where necessary, independent placing of the coupling and epicyclic units, with appropriate extension of the axles 12 and 17. Also if the couplings A and B are desired to be separated this can be achieved if shaft 18 is lengthened.

The rotation of the shaft 1 at N1 is transmitted through the casing 2 of the coupling A and the runner 3, via the metal "fluid" 16, to the shaft 18 which is secured to the casing 10 of the coupling B, and shaft 17 which carries, integrally therewith, the sun gear 4, and, therefrom, to the planet gear 5 of the epicyclic train, to the cage 8 on which the planet gears are carried by the pins 7. The cage is secured at 9 to the axle 12 which carries the power with torque multiplication to the driven machine.

The shaft 12 again extends through a hollow shaft 17 and is rigidly connected to the runner 13 of coupling B, directly to transmit to shaft 12 that torque which has been abstracted from the torque transmitted by coupling A.

This construction is also shown as having a toothed second cage 8' idly mounted on the shaft 17 but rigidly connected to cage 8 through the pins 7 to transmit the torque to a gear 20 with which the cage 8' meshes. Gear 20 is secured on a shaft 12' which is connected at N2' to the driven machine. This fact allows double use to be made of certain component parts and a decrease of the axial bulk as well as the provision of a reversal mechanism and further reduction ratios connected to shaft 12'.

The components 8 and 8' can be a single-piece cage, with appropriate spaces for containing the planet gears 5.

In the arran-gement illustrated in FIG. 4, the basic arrangement has been split into two portions, the two shafts 17 and 12 being disposed parallel to each other and connected together by means of meshing gears 18 and 20 for transmitting the movement from the runner 3 of coupling A to the impeller or casing 10 of coupling B.

Cage 8 has external gear teeth meshing with a gear 9 on shaft 12 for transferring to runner 13 of coupling B, through shaft 12, the differential motion as produced by the planetary gears on the shaft 17.

The shaft 12 secured to runner 13 and the gear 9, extends beyond the latter to transmit the rotation to the driven machine and, with a gear 14 on the shaft, it is possible to transmit the rotation and the torque to N2' through the meshing gear 14'. In all of the illustrated arrangements the annular gear 6 provides the reaction to the torque transferred by the planet gears 5, restrained against counter rotation by the free wheel or brake 15 when a drive torque is transmitted by the epicyclic train.

Further couplings A' and B' may be arranged coaxially with the respective couplings A and B, the couplings A and A' having their casings secured together and their runners secured together, and the casings and runners of the couplings B and B' being similarly secured together. This serves to share whenever necessary, the work and the thermal stress to which the larger power metal fluid couplings are subjected, which couplings do not provide proportionate increases of their volumes and their cooling surfaces as the power increases.

This hypothesis is valid for slip couplings of any description.

What is claimed is:

1. A differential torque transmitting device comprising first and second rotary slip couplings, the second being of a type whereof the torque-transmitting capacity increases as the rotational speed of the coupling increases, each of which couplings has an input member and an output member, the output member of the first coupling being directly connected to the input member of the second coupling and the output member of the second coupling being connected to the input of a driven machine, an epicyclic reduction gear train having an input element connected to the output member of the first coupling at a speed which bears a constant relationship to the speed of the input member of the second coupling, a reaction element, associated with said gear train, and an output element drivingly connected to the output element of the second coupling, and means acting to hold said reaction element of said gear train fixed against rotation in one direction only and adapted automatically to release said reaction element for rotation in the opposite direction to discontinue the transmission of power through the epicyclic gear train to the output element of the second coupling and to permit the speed of the output member of the second coupling to rise to a value equal to that of the input member of the second coupling, said second coupling being designed so that, whenever the input shaft of the driven machine slows down as a result of an external cause, the torque transmitted backwards by the output member of the second coupling to the first coupling is always lower than the torque transmitted by the output member of the said first coupling to the second coupling.

2. A device as claimed in claim 1, wherein the two couplings are of a fluid type employing metal particles as the operating fluid.

3. A device as claimed in claim 1, wherein the epicyclic gear train comprises a sun gear secured on a shaft which interconnects the output member of the first coupling and the input member of the second coupling, a cage drivingly connected to the output member of the second coupling and carrying planetary gears which mesh with the sun gear, and an annular reaction gear element surrounding and meshing with the planetary gears, the releasable means for holding the reaction element stationary operating on the annular gear element whereby to enable said transmission of power through the epicyclic gear train to be brought into and out of operation.

4. A device as claimed in claim 1, wherein said means comprises a releasable brake operated by a servo mechanism.

5. A device as in claim 1 wherein the input member of each rotary slip coupling is a casing and the output member of each rotary slip coupling is an impeller within its respective casing and wherein the impeller of the second coupling has a diameter 10% lower than that of the impeller of the first coupling.

* * * * *